United States Patent [19]

Notarianni et al.

[11] Patent Number: 5,760,347
[45] Date of Patent: Jun. 2, 1998

[54] DIGITIZER PEN APPARATUS

[75] Inventors: Louis Michael Notarianni, Conshohocken; Michael Joseph Leonard, Philadelphia, both of Pa.

[73] Assignee: Numonics, Inc., Montgomeryville, Pa.

[21] Appl. No.: 731,157

[22] Filed: Oct. 10, 1996

[51] Int. Cl.⁶ .............................. G08C 21/00; G09G 3/02
[52] U.S. Cl. ........................ 178/18; 178/87; 345/179; 345/184
[58] Field of Search ............................. 178/18, 19, 87; 345/179, 180, 182, 183, 184

[56] References Cited

U.S. PATENT DOCUMENTS

| | | | |
|---|---|---|---|
| 5,247,137 | 9/1993 | Epperson | 178/87 |
| 5,541,375 | 7/1996 | Dam et al. | 178/18 |
| 5,548,092 | 8/1996 | Shriver | 345/180 |
| 5,576,502 | 11/1996 | Fukushima et al. | 178/18 |
| 5,581,052 | 12/1996 | Padula et al. | 345/179 |

Primary Examiner—Curtis Kuntz
Assistant Examiner—Vijay Shankar
Attorney, Agent, or Firm—Paul & Paul

[57] ABSTRACT

An apparatus is adapted to receive a mechanism, for example, such as a removable felt tipped marker insert, for use in a graphic input system. The apparatus comprises a housing, retaining mechanism disposed within at least a portion of the housing and which is adapted for holding the mechanism, and an actuating mechanism between the retaining mechanism and the housing for movement of the retaining mechanism relative to the housing so as to actuate the apparatus.

21 Claims, 5 Drawing Sheets

DIGITIZER PEN APPARATUS

FIELD OF THE INVENTION

The present invention relates generally to graphic input systems and more particularly to electronic pens utilized in connection with graphic input systems.

BACKGROUND OF THE INVENTION

Graphic input systems are conventionally known which operate to generate electrical signals that represent the position of a pen or other mechanism relative to an input surface. The electrical signals generated are then stored so that the information written on the input surface may be reproduced at some later point.

An example of a graphic input system is illustrated in U.S. patent application Ser. No. 08/548,283 (hereinafter the "'283 application") filed Oct. 25, 1995 to Phillip L. Henderson and David J. Porter, which is assigned to the assignee of the present application, and is incorporated by reference herein. The '283 application discloses in one embodiment an apparatus comprising an x-y digitizer which is adapted to receive a document, a support for retaining the digitizer, a control unit and a digitizer pen which is used to mark the document when positioned on the digitizer A preferred digitizer pen is disclosed in the '283 application and includes a tip switch which is adapted to actuate when the digitizer pen is pressed sufficiently hard enough to mark on the document. The digitizer pen also preferably includes a removable felt tipped marker insert which actuates the tip switch when applied to the document surface.

Conventional digitizer pens operable with graphic input systems, such as that shown in the co-pending '283 application, are known to have some common deficiencies which are addressed by the present invention. For example, with prior art digitizer pens it is relatively complicated and cumbersome for the user to change the removable insert for another insert. For instance, in order to remove an insert, two hands are required so that the insert can be removed from its position received within the digitizer pen. Also, another drawback is that the opening which is provided in the digitizer pen for receiving the insert is of a certain defined size, which imposes the limitation that the insert be of a corresponding size and configuration in order to be able to fit securely within the digitizer pen. Further, movement of the insert in order to actuate the tip switch can be adversely effected where there is excessive friction occurring between the insert and the digitizer pen.

The present invention has been developed in view of the foregoing and to overcome the deficiencies of the prior art.

SUMMARY OF THE INVENTION

The present invention discloses an apparatus which is adapted to receive a mechanism, for example, such as a removable felt tipped marker insert, for use in a graphic input system. For this purpose, the apparatus comprises a housing, retaining means disposed within at least a portion of the housing and which is adapted for holding the mechanism, and actuating means between the retaining means and the housing for movement of the retaining means relative to the housing so as to actuate the apparatus.

In accordance with the present invention, an object is to provide a novel apparatus for an electronic pen.

It is another object of the present invention to provide a novel apparatus for a digitizer pen which is adapted to receive and hold a mechanism, for example, an insert such as a marker of varying sizes.

It is another object of the present invention to provide an apparatus for an electronic pen which provides for single hand release/loading of a mechanism into the pen, and which is accomplished with relative ease and without discomfort to the user.

Still another object of the present invention is to provide an apparatus for an electronic pen which is fully contained and which can fit into a limited area without interfering with the operation of the electronic pen.

Another object of the present invention is to provide an apparatus for an electronic pen into which a mechanism is received, for example, an insert such as a marker, and which is movable so as to actuate a switch and with a minimum of friction.

Still another object of the present invention is to provide an apparatus for an electronic pen which is adapted to receive and hold a mechanism comprised substantially of metal or plastic and without damaging the mechanism.

These and other objects of the present invention will become more readily apparent when taking into consideration with the following description and the attached drawings.

DETAILED DESCRIPTION OF THE PREFERRED EMBODIMENTS

Figure 1:
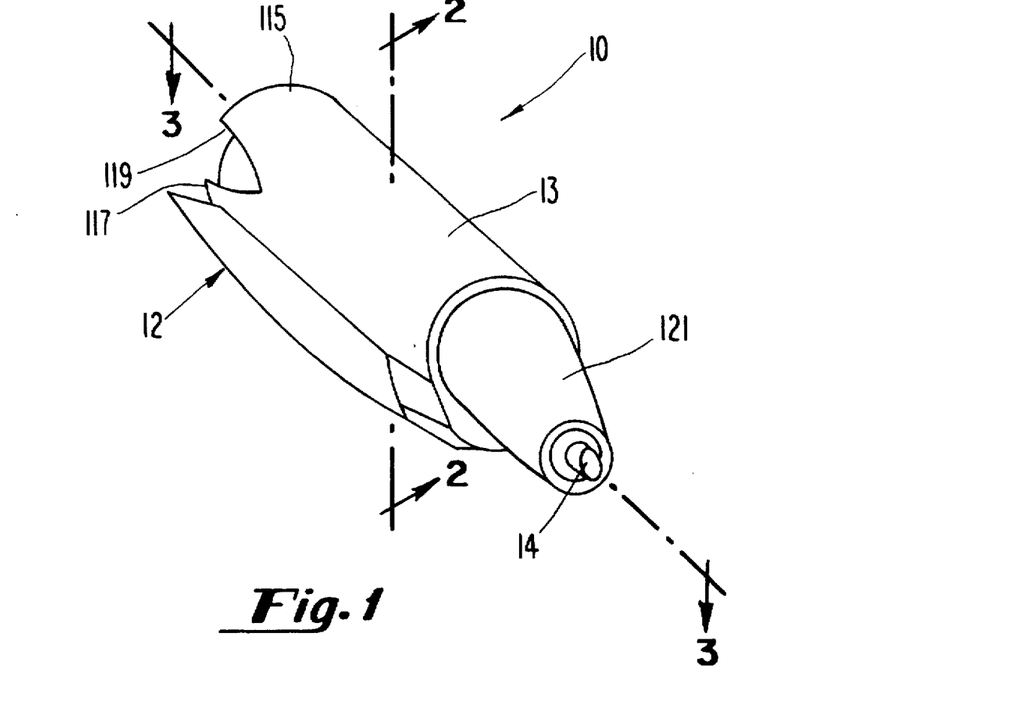
FIG. 1 is a perspective view of an apparatus in accordance with an embodiment of the present invention.

Referring now to the drawings in detail, wherein like reference numerals indicate like elements throughout the several views, there is shown in FIG. 1 an apparatus in accordance with an embodiment of the present invention. The apparatus 10 as is shown in FIG. 1 includes a housing 12, and in the present embodiment, a mechanism 14 is shown received within the housing 12. In a preferred embodiment, the housing 12 and mechanism 14 comprise a digitizer pen, the details of which will be more fully set forth hereinafter.

Figure 2:
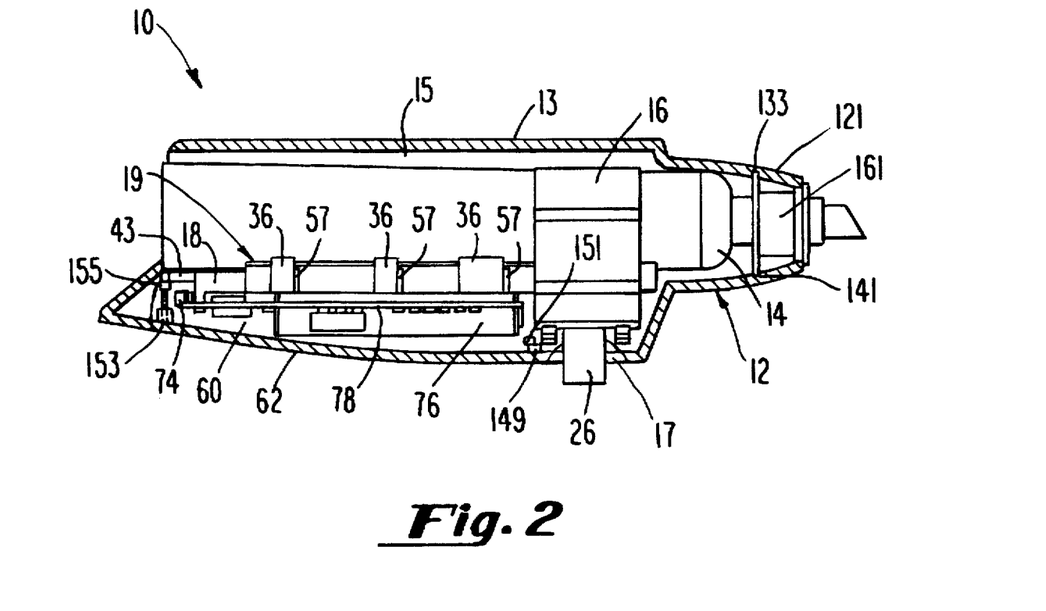
FIG. 2 is a sectional side elevational view of the apparatus of FIG. 1 taken along the line 2—2.

As is shown in FIG. 1 and the sectional side elevational view of FIG. 2, the apparatus 10 in accordance with the present embodiment further comprises a retaining means 16 disposed within at least a portion of the housing 12 and actuating means 19 between the housing 12 and the retaining means 16, which provides movement of the retaining means 16 relative to the housing 12 for the purpose described below. In the present embodiment, preferably the housing 12 includes an outer surface 13 defined by upper and lower portions 115 and 117, respectively, a pair of opposing generally U-shaped slots 119 within the outer surface 13 provided at its back end (only one is visible), a conical shaped nose 121 at its front end, a passage 15 extending longitudinally through the outer surface 13, and an opening 17 extending through the outer surface 13 of the lower portion 117 and into the passage 15. In FIG. 2, the mechanism 14 is shown received within the retaining means 16 and extends through the passage 15 of the housing 12. The retaining means 16 is shown positioned within the passage 15 and extends through the outer surface 13 of the housing 12.

Figure 2A:
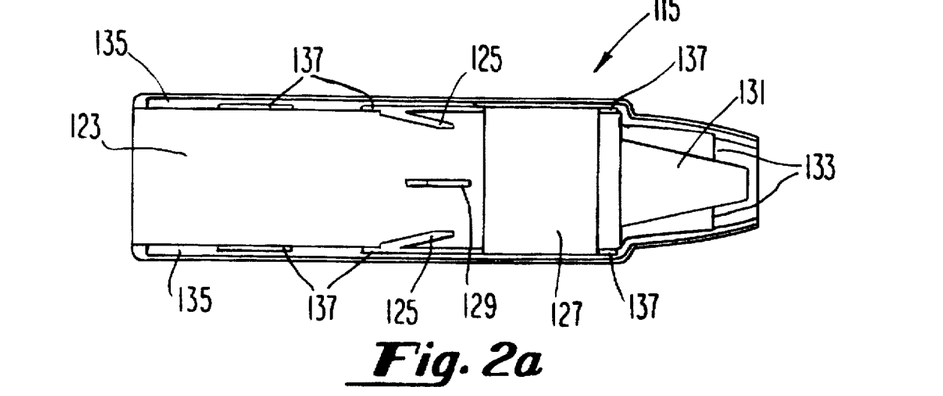
FIG. 2a is an isolated bottom plan view of a top portion of a housing of FIG. 1.

In FIG. 2a is shown an isolated bottom plan view of the upper portion 115 of the housing 12. In this embodiment, the upper portion 115 as shown includes an inner surface 123 and two opposing inner walls 125 connected with the inner surface 123 and angled in an inward direction toward the front end of the upper portion 115. The inner walls 125 operate to help center the mechanism 14 when it is inserted into the housing 12. Specifically, preferably the mechanism 14 is inserted into the back end of the housing 12, with the front end of the mechanism 14 moving past the inner walls 125 and into the position shown in FIG. 2. As shown in FIG. 2a, the upper portion 115 also includes in this embodiment a channel 127 adjacent the inner walls 125, a center wall 129 between the inner wells 125, a generally conical shaped aperture 131 within the inner surface 123 proximate the front end of the top portion 115, and a pair of opposing shoulders 133 within the inner surface 123 also proximate the front end of the top portion 115 and adjacent the top of the conical shaped aperture 131. The center wall 129 as shown includes one tapered end toward the back end of the upper portion 115, which preferably also works to help center the mechanism 14 when it is inserted. The mechanism 14 when inserted preferably has its front end positioned within the generally conical shaped aperture 131. In addition, in this embodiment the top portion 115 also includes a pair of ridges 135 at the perimeter of its opposing sides which extend the length thereof and three projecting walls 137 positioned adjacent each opposing ridge 135, which facilitate the connection of the upper and lower portions 115 and 117 of the housing 12 in the position shown in FIG. 2.

Figure 3:
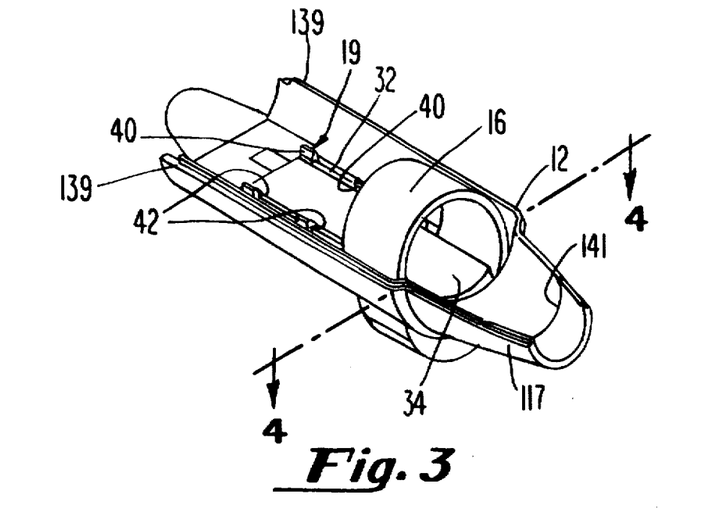
FIG. 3 is a sectional perspective view of the apparatus of FIG. 1 taken along the line 3—3, and without a mechanism shown in FIG. 1.

In FIG. 3 is shown a perspective view of the apparatus 10 with the upper portion 115 removed. As shown, the lower portion 117 of the housing 12 includes in this embodiment a pair of projections 139 at the perimeter of its opposing sides, which are adapted to be received between the pair of ridges 135 and projecting walls 137 of the upper portion 115 for connection of these members in the position shown in FIG. 2. In this embodiment, preferably the upper and lower portions 115 and 117 of the housing 12 are ultrasonically welded together, although other suitable means can also be used, such as an adhesive. Also, as shown in FIGS. 2 and 3, the lower portion 117 in this embodiment also includes a shoulder 141 proximate its front end, which is generally opposite the shoulders 133 in the top portion 115. In the present embodiment, as shown in FIG. 1, a bobbin 161 is preferably provided which is generally cylindrical in shape and defined by a back portion positioned within shoulders 141 and 133, a middle portion and a front portion proximate the front end of the housing 12. Although not shown, the bobbin 161 also includes a bore generally cylindrical in shape extending therein into which the mechanism 14 is received. Preferably, the bobbin 161 in operation acts as a conventional coil.

The mechanism 14 in accordance with the present invention may include writing instruments such as dry erase markers, ink pens, graphite pencils, wax pencils and the like, as well as non-marking instruments such as an eraser. In the preferred embodiment, the mechanism 14 is provided in the form of a conventional dry erase marker. For example, the mechanism 14 can comprise dry erase markers of various colors and which are of various defined sizes. In a preferred embodiment, the mechanism 14 ranges in diameter from approximately 0.750 inches to approximately 0.590 inches and is of a length greater than approximately 3.5 inches, however, as should be understood, other suitable diameters and lengths can be utilized where desired. Preferably, the mechanism 14 when comprising a dry erase marker includes a marking tip, such as a felt tip, and a body into which the marking tip is connected. In accordance with the present embodiment, the body preferably is comprised substantially of metal or plastic, consistent with conventional dry erase markers, or, alternatively, as should be understood, the body may be comprised of any other suitable material.

The structure of the retaining means 16 is illustrated in FIGS. 6–10. As is shown in the perspective view of FIG. 6, the retaining means 16 in accordance with the present embodiment comprises, as portions thereof, a generally elongated clamp or holder having an opening 18 therethrough into which the mechanism 14 is adapted to be received, adjustment means for varying a defined size of said opening 18 and detachment means for releasing the mechanism 14, as will be described hereinafter. As is shown in the front elevational view of FIG. 7, the clamp 16 is comprised of a top portion 20 generally circular in shape and a bottom portion 22 generally rectangular in shape and connected with the top portion 20. Similarly, the opening 18 through the clamp 16 is preferably of a configuration corresponding to that of the top portion 20 and bottom portion 22 in the present embodiment.

Figure 6:
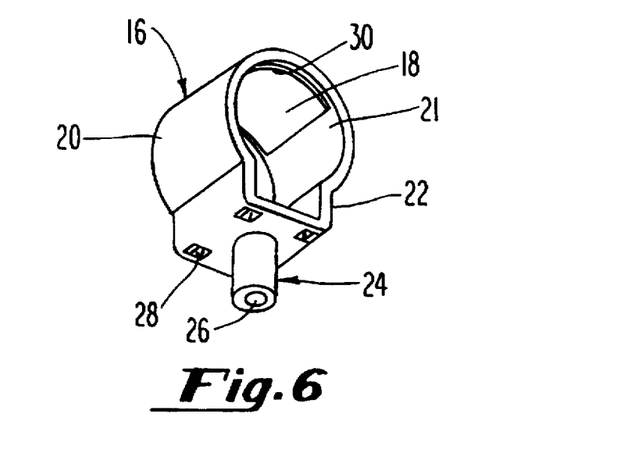
FIG. 6 is perspective view of the retaining means of FIG. 5.

The clamp 16 also includes a button means 24 which, in the present embodiment, is connected with and extending outward from a lower surface 23 of the bottom portion 22. The button means 24 may either be formed directly to the bottom portion 22 or, alternatively, may be provided as a separate member connected to the bottom portion 22 by any suitable conventional means, such as by an adhesive, by a screw connection or the like. In the present embodiment, as best seen in FIG. 6, the button means 24 is preferably comprised of a post 26, generally elongated and elliptical in cross-section, connected with the lower surface 23 of the bottom portion 22, and includes an opening generally elliptical in shape extending the longitudinal axis therethrough. As shown in FIG. 2, the post 26 extends through the opening 17 of the housing 12. However, as should be understood, the button means can be provided at other locations of the housing 12 as well. In this embodiment, the opening 17 is sized larger than the diameter of the post 26 and is defined by a substantially concave depression within the outer surface 13, with a substantially elliptical aperture extending through the central portion of the concave depression and into the passage 15.

In the present embodiment, the clamp 16 also includes at least one aperture or receptacle 28, and more preferably four apertures 28, which extend through the bottom portion 22. As best seen in the bottom plan view of FIG. 10, the apertures 28 preferably are each generally square in configuration and are positioned proximate each of the four corners of the substantially square shaped lower surface 23 of the bottom portion 22. The function of the apertures 28 will be described herein.

Figure 7:
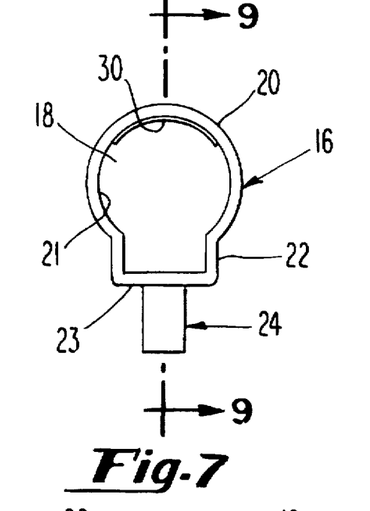
FIG. 7 is a front elevational view of the retaining means of FIG. 6.
Figure 8:
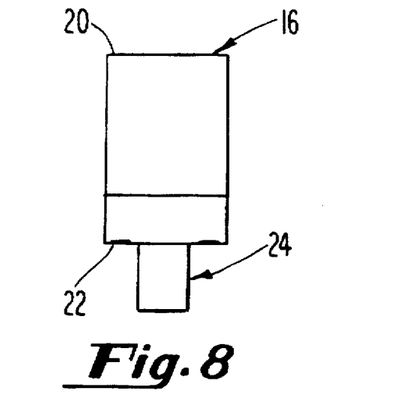
FIG. 8 is a side elevational view of the retaining means of FIG. 6.
Figure 9:
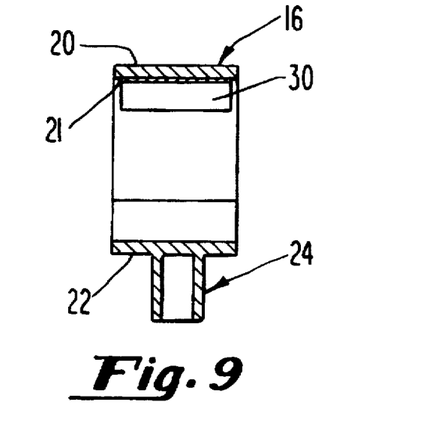
FIG. 9 is a sectional side elevational view of the retaining means of FIG. 8 taken along the line 9—9 of FIG. 6.
Figure 10:
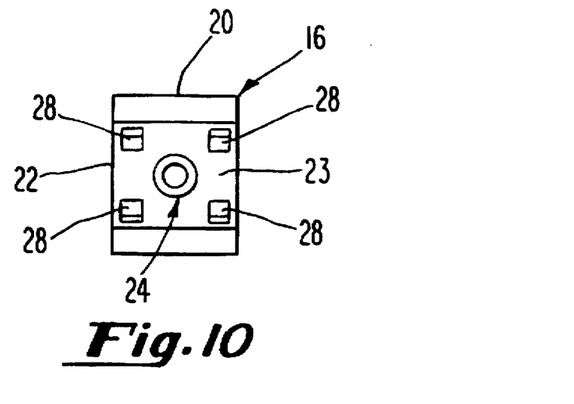
FIG. 10 is a bottom view of the retaining means of FIG. 6.

As best seen in FIGS. 7 and 9, the clamp 16 also preferably includes at least one support 30, which in this embodiment is generally rectangular in shape extending outward from an inner surface 21 of the top portion 20 of the clamp 16, and positioned generally opposite the button means 24 It should be understood, however, that the support 30 can be provided of any desired configuration, such as generally oval, and at any desired position. The support 30 in the present preferred embodiment is molded together (overmolded) with the inner surface 21 of the top portion 20, however, the support 30 may also be attached to the inner surface 21 by other conventional means, such as an adhesive. Alternatively, the support 30 may be provided as one piece connected to and extending from the top portion 20 of the clamp 16 The function of the support 30 will be described in more detail below.

The actuating means 19 in accordance with the present embodiment comprises guide means 32 attached to the housing 12 and sled means 34 attached to the retaining means 16, as is best seen in FIG. 3. Preferably, the guide means 32 and sled means 36 are connected together in such a manner so as to provide movement of the sled means 34 relative to the guide means 32, as will be described herein. In the present embodiment, fastening means are provided between the guide means 32 and sled means 34 in order to provide connection of these members. The fastening means comprises at least one and more preferably six generally flexible guide fingers 36 connected with and extending outwardly from the guide means 32, into which is received the sled means 34 in the manner shown in FIG. 3.

Figure 4:
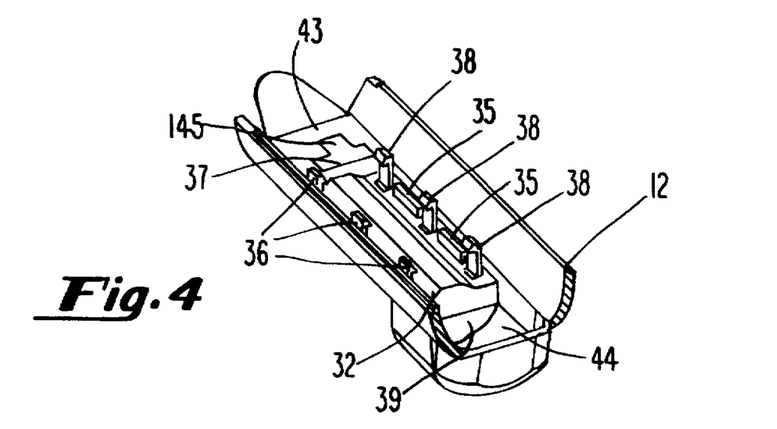
FIG. 4 is a sectional perspective view of the apparatus of FIG. 3 taken along the line 4—4, and without a retaining means and a sled means shown in FIG. 3.

As best seen in FIG. 4, the guide means 32 in this embodiment comprises a generally elongate guide member having a back end 37, a front end 39 and opposing side portions defined by two side walls 35 comprising each side portion extending outward from a bottom surface 143. In this embodiment, preferably three of the guide fingers 36 are connected proximate each opposing side portion, which are positioned on opposite sides of each of the two side walls 35. As is shown, each of the guide fingers 36 include a channel 38 therein into which the sled means 34 is received. In this embodiment, each of the cavities 38 is defined by a substantially V-shape portion attached proximate the terminating end of each guide finger 36, and which extend in an inward direction toward the opposing side portion 35. Preferably, the substantially V-shaped portion is defined by a camming surface 40 and a locking surface 42 generally opposite the camming surface 40, as is shown in FIG. 3. The guide member 32 in this embodiment is provided as a part of the housing 12, with the bottom surface 143 defined as a part of a lower wall 43 of the housing 12, with the guide fingers 36 connected to and extending outward therefrom.

As is shown in FIG. 4, the lower wall 43 of the housing 12 includes a generally T-shaped hole 145 extending through the lower wall 43 adjacent the back end 37 of the guide member 32, and a cavity 44 extending through the lower wall 43, which is generally rectangular in this embodiment and terminates by the opening 17.

Figure 11:
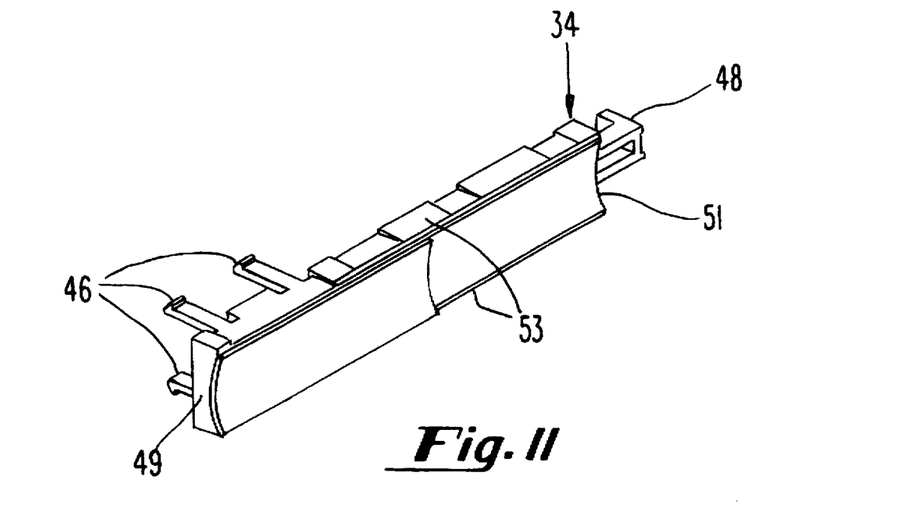
FIG. 11 is an isolated perspective view of the sled means of FIG. 3.
Figure 12:
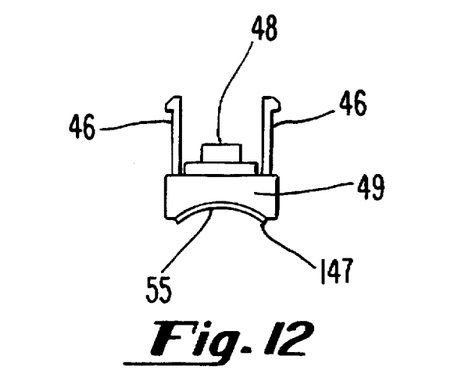
FIG. 12 is a front elevational view of the sled means of FIG. 11.
Figure 13:
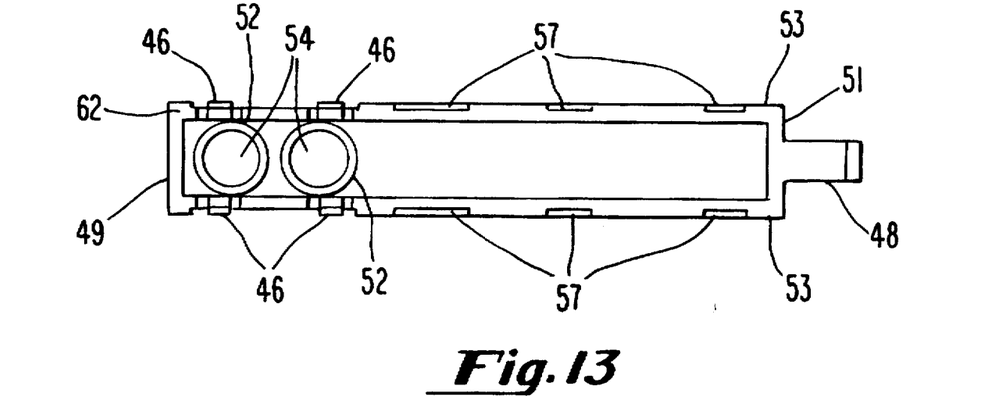
FIG. 13 is a top plan view of the sled means of FIG. 11.
Figure 14:
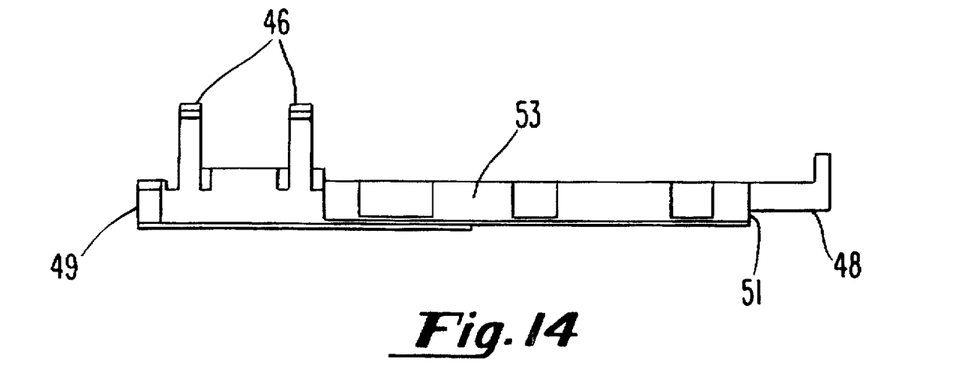
FIG. 14 is a side elevational view of the sled means of FIG. 11.
Figure 15:
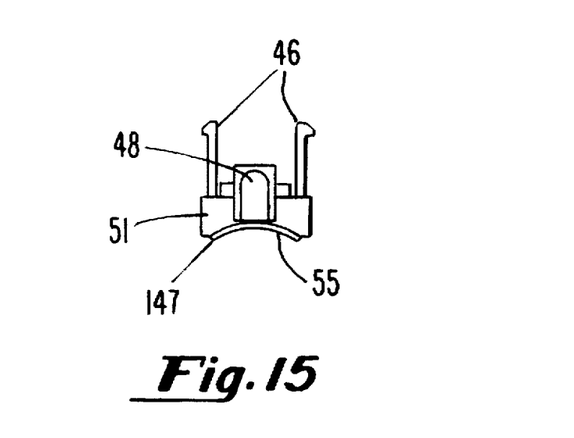
FIG. 15 is a rear elevational view of the sled means of FIG. 11.
Figure 16:
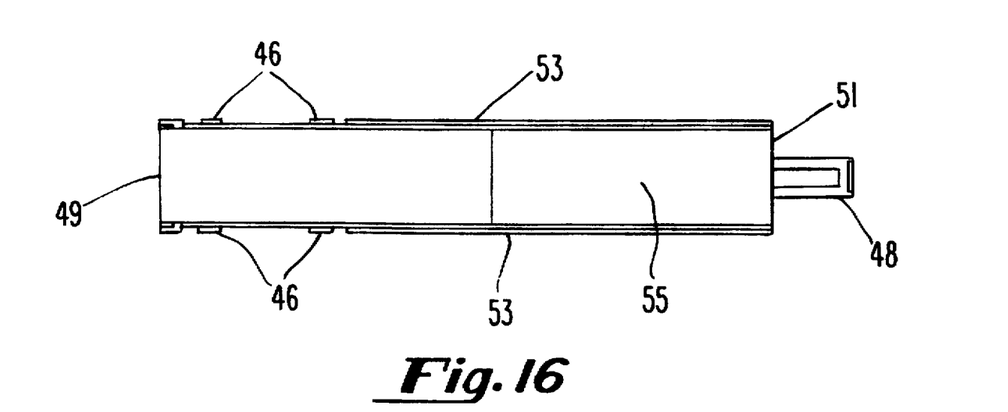
FIG. 16 is a bottom plan view of the sled means of FIG. 11.

The structure of the sled means 34 is shown in FIGS. 11-16. As shown in FIGS. 11 and 13, the sled means 34 is generally elongated along its longitudinal axis defining a body having a front wall 49, a back wall 51 and opposing side walls 53. In addition, the sled means 34 includes at least one, and in the present embodiment preferably at least two, and more preferably four generally flexible sled or body fingers 46. The sled fingers 46 are each attached at one end thereof to the sled means 34 proximate the front wall 49. In the present embodiment, the four sled fingers 46 are each positioned proximate the opposing side walls 53 of the sled means 34, and include a camming surface and a locking surface proximate their terminating ends, similar to that of the camming surface 40 and locking surface 42 of the guide member 32. However, a difference in the camming and locking surfaces of the sled fingers 46 from that of the guide fingers 36 is that the respective positions are reversed approximately 180 degrees, so that the camming and locking surfaces of each pair of fingers 46 extend in an outward direction, as is shown in FIG. 12. In addition, as seen in FIG. 15, preferably the sled means 34 includes a lower surface 55, which is generally concave in this embodiment, and a support 147 attached to the lower surface 55 similar to the support 30, into which the mechanism 14 is adapted to be received in operation. As should be understood, other configurations of the lower surface 55 can also be provided, such as V-shaped. Furthermore, as best shown in FIGS. 14 and 15, the sled means 34 includes an actuating portion 48, which is generally L-shaped in this embodiment, connected with the back wall 51, for the purpose hereinafter described.

In addition, as best shown in FIGS. 11 and 13, the sled means 34 includes within its opposing side walls 53 at least one, preferably two and more preferably six cavities 57 into which the guide fingers 36 are received, which in this embodiment comprises the fastening means. Generally, the position and shape of the cavities 57 within the sled means 34 correspond to that of the channels 38 of the guide fingers 36. In this embodiment, the cavities 57 are each generally rectangular and defined by front and back walls and three of the cavities 57 are positioned on each opposing side wall 53 of the sled means 34 and are generally equally spaced from each other. When assembled, the sled means 34 is positioned between the opposing side portions of the guide means 32 defined by the side walls 35. As shown in FIG. 2, preferably, in this embodiment, the width of the cavities 57 between the front and back walls are greater than the width of the guide fingers 36, at least at the location of the channels 38 received within the cavities 57. In this manner, the interaction of the guide fingers 36 and cavities 57 provide for the movement of the sled means 34 relative to the guide means 32, as indicated earlier. In particular, in this embodiment, the position of the guide fingers 36 are fixed, and the sled means 34 can be moved back and forth between the front and back walls of the cavities 57.

As is shown in FIG. 13, the sled means 34 also includes a generally rectangular cavity 60 within its upper surface 62 and at least one, and preferably in this embodiment, two substantially circular bosses extending upward from the upper surface 62. In the present embodiment, each of the substantially circular bosses 52 are positioned generally between an opposing pair of the sled fingers 46. The substantially circular bosses 52 also include a generally circular cavity 54 therein extending within its terminating end.

Figure 5:
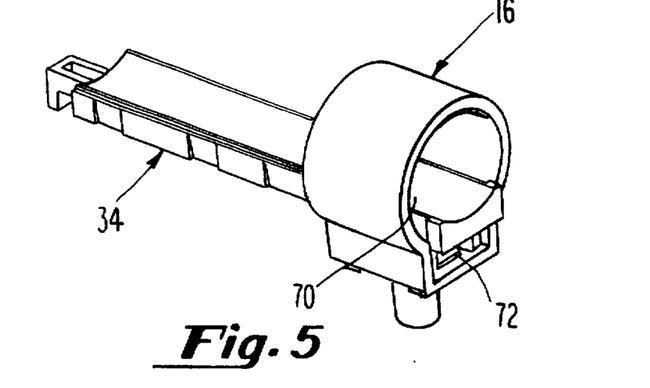
FIG. 5 is an isolated perspective view of the retaining means and sled means of FIG. 3.

Upon assembly, the clamp 16 is connected with the sled means 34 in the position shown in FIG. 5. For this purpose, attachment means are provided between the retaining means 16 and sled means 34 for connection of these members. In the present embodiment, attachment of the clamp 16 and sled means 34 is accomplished by snap-fit connection of the sled fingers 46 within the apertures 28 extending through the bottom surface 23 of the clamp 16, as is shown in FIGS. 14 and 9, respectively. In particular, as each of the sled fingers 46 are received into the apertures 28, the sled fingers 46 are initially flexed in an inward direction, due to engagement with the camming surface of the clamp 16 proximate the aperture 28. Thereafter, continued insertion of the sled finger 46 moves the camming surface past the aperture 28 allowing the sled finger 46 to move back towards its original position, with the locking surface of the sled finger 46 then preferably positioned against the outer surface 23 of the clamp 16.

In the present embodiment, the apparatus 10 preferably also includes a bearing member 70 and biasing means positioned between the clamp 16 and the bearing member 70, as shown in FIG. 5. In the present preferred embodiment, the bearing member 70 is comprised of a part of the sled means 34 and the biasing means comprises at least one and more preferably two conventional steel coil springs 72 (only one of which is visible in FIG. 5). It should be understood that other types of biasing means can also be utilized where desired, for example, one or more leaf strings, elastomer springs, to name a few. Also the biasing means can be of other configurations and positioned at different locations relative to the apparatus of the present invention; for example, the biasing means can be one or more springs which are positioned against the outer surface of the clamp 16. In this embodiment, although not shown, one end of the coil springs 72 is received within the substantially circular cavities 54 of the bosses 52, and the opposite ends of the coil springs 72 come into engagement with the inside surface 21 of the clamp 16. The coil springs 72 operate to bias the bearing member 70 of the sled means 34 relative to the clamp 16, as will be more fully described in the following paragraphs. In another embodiment, the biasing means can also be provided as a part of the bearing member, for example, the bearing member can be of a sufficiently flexible or resilient material so that no separate biasing means is required, but rather the function of the biasing means is provided by the bearing member itself. Also, in still another embodiment more than one bearing member can be utilized where desired; for example, the mechanism 14 can be positioned between two opposing bearing members or proximate the middle of three or more bearing members.

In the present preferred embodiment, the housing 12, bobbin 161, top and bottom portions 20 and 22 of the clamp 16, button means 24 and actuating means 19 comprising the guide means 32 and sled means 34 are each comprised of conventional thermoplastic or thermosetting materials, and the support 30 and support 147 is comprised of a conventional elastomer, such as rubber, however, as should be understood, any other suitable materials can also be used for the same purpose without departing from the spirit of the present invention.

In accordance with the present embodiment, the apparatus 10 in combination with the mechanism 14 comprises a conventional digitizer pen, as indicated above. Preferably, the operation of the apparatus 10 is responsive to the mechanism 14 contained within the housing 12. For this purpose, as shown in FIG. 2, the apparatus 10 includes a switch 74 which is actuated by the actuating portion 48 of the sled means 34 when the mechanism 14 is applied to an input surface. Preferably, the switch 74 comprises a conventional push button switch, disposed within the housing 12, which, upon actuation, controls operation of the apparatus 10. In addition, in accordance with the present embodiment, the apparatus 10 also includes other conventionally known components in order to provide operation as a digitizer pen. For example, one such embodiment of a digitizer pen is described in the '283 application, and includes a tip switch and a conventional digitizer pen position sensing mechanism having a coil which is disposed within a tuned circuit driven at a predetermined frequency. The apparatus 10 may also be either that of conventionally known corded varieties or alternatively be of the cordless type. In the present embodiment, the apparatus 10 is of the cordless type and includes a battery 76 in order to provide operation. Preferably, the components providing operation of the digitizer pen are disposed within the housing 12, and more preferably are of sufficient size in order to be contained within the housing 12. For this purpose, in the present embodiment, the housing 12 includes a chamber 60 into which the electronics of the apparatus 10 are received. As shown in FIG. 2, the electronics disposed within the chamber 60 include the battery 76, a circuit board 78 and switch 74. In addition, the housing 12 preferably includes a cover 62 which is attached by conventional means to enclose the components within the chamber 60. The cover 62 can be either permanently or removably attached, for example, by an adhesive, screws, or snap-fit, such as by incorporating a similar arrangement as that described above in relation to the generally flexible fingers 46 and cavities 28. For example, the cover 62 can incorporate at least one or a plurality of generally flexible fingers which are received within cavities provided within the housing 12. In this embodiment, the cover includes a front tab 149, which is received within a cavity 151 within the housing 12 adjacent the opening 17, and a pair of apertures 153 proximate its back end (only one of which is visible, shown in dotted lines) in which screws are received, and which engage a corresponding pair of projections having threaded apertures 155 (only one of which is visible) extending from the lower wall 43 of the housing 12.

The operation of the apparatus 10 in accordance with the present embodiment will now be described. In order to install the mechanism 14, the button means 24 is depressed in an inward direction which works to displace the position of the clamp 16 relative to the bearing member 70 of the sled means 34, which is disposed within the opening 18 of the clamp 16. In particular, as the button means 24 is depressed, the inner surface 21 of the bottom portion 22 of the clamp 16 is moved closer to the bearing member 70 of the sled means 34, which is in opposition to the tension of the coil springs 72, and results in an increase in the size of the opening 18 in the clamp 16. At that point, the mechanism 14 can then be inserted into the clamp opening 18 as the button means 24 remains depressed. As indicated earlier, preferably the front end of the mechanism 14 is inserted into the back end of the apparatus 10 and then into the clamp opening 18. In this embodiment, the inside surface 123 of the upper portion 115 of the housing 12 provides a hard stop of the clamp 16 so that the sled means 34 does not overstress as the button means 24 is depressed. In particular, the clamp 16 as the button means 24 is depressed is adapted to engage the channel 127 of the upper portion 115. Thereafter, when the mechanism 14 is within its desired position, the button means 24 is released which allows movement of clamp 16 back toward its original position, so that the outer surface of the mechanism 14 comes into engagement with the support 30 of the clamp 16 and support 147 of the sled means 34. Preferably, the mechanism 14 is installed in the foregoing manner when the clamp 16 and the sled means 34 are positioned within the housing 12, however, the mechanism 14 can also be installed when the clamp 16 and sled means 34 are positioned outside of the housing 12. In this embodiment, the bearing member 70 and the coil springs 72 comprise adjustment means for varying the size of the clamp opening 18. The mechanism 14 when mounted within the clamp 16 can then be used on an input surface, such as that of any conventional graphic input systems, for example, one type is shown in the '283 application comprising a flip chart which is associated with a digitizer pad. In operation, as the mechanism 14 is pressed against the input surface with sufficient force, the mechanism 14 is moved in an inward direction away from the input surface due to the sliding movement of the sled means 34 relative to the guide means 32. In this manner, sufficient displacement of the mechanism 14 operates to actuate the switch 74 by engagement of the actuating portion 48 of the sled means 34 to operate the digitizer pen.

Similar to the process for installing the mechanism 14 described above, the mechanism 14 can also be removed in the same manner by pressing of the button means 24 which moves the support 30 away from the outer surface of the mechanism 14 for increasing the size of the clamp opening 18. Thereafter, the mechanism 14 can be removed. In this embodiment, the U-shaped slots 119 provide for easier access so that the user can reach the mechanism 14 with his or her fingers, especially where the mechanism 14 is shorter in length. In this manner, the button means 24, bearing member 70 and coil springs 72 in the present embodiment comprise detachment means for varying a position of the clamp 16 relative to the bearing member 70 and in opposition to the coil springs 72, in order to increase the size of the clamp opening 18 for releasing the mechanism 14. Other configurations of the button means can also be provided, for example, in another embodiment the button means can comprise a pivoting handle or lever connected with a cam. For instance, with reference to the present embodiment, the cam can be positioned either between the bearing member and the inner surface 21 of the top portion 20 of the clamp 16, or between the lower surface 23 of the clamp 16 and inner surface of the lower portion 117 of the housing 12. It should be understood that this illustration is merely an example and in no way is meant to limit the possible variations or configuration of the button means.

Based on that set forth above, it should be understood that there are several advantages to the present invention. One advantage of the apparatus of the present invention is that it is adapted to receive and hold mechanisms of varying diameters. In particular, this is accomplished since the size of the opening 18 extending through the retaining means 16 is adjustable via the bearing member 70 of the slide means 34 and biasing means 72, which urges the bearing member 70 in the direction of the mechanism 14 when the mechanism 14 is positioned within the clamp opening 18.

Another advantage of the present invention is that the button means 24 in a preferred embodiment provides for either single hand release or loading of the mechanism 14. In particular, the operator can depress the button means 24 which increases the size of the clamp opening 18 allowing the operator to either release a mechanism previously installed within the clamp 16, load a mechanism into the clamp 16, or alternatively, release one mechanism from the clamp 16 followed then by loading a different mechanism. Thereafter, the operator can remove his or her finger from the button means 24 allowing the size of the clamp opening 18 to decrease, so that the support 30 will come into contact with the outer surface of the mechanism 14.

Still another advantage of the present invention is that the mechanism, when depressed against a surface, is movable with a minimum of friction due to the sliding engagement between the sled means 34 and guide means 32.

In addition, another advantage is that the present invention is fully contained and can fit into a limited area without interfering with the operation of the apparatus.

Still another advantage of the present invention is that the holding mechanism comprising the clamp 16, bearing member 70 of the sled means 34 and biasing means 72 can hold a mechanism comprised substantially of metal, plastic or other materials, and without damaging the mechanism.

It will be recognized by those skilled in the art that changes may be made by the above-described embodiments of the invention without departing from the broad inventive concepts thereof. In particular, other configurations of the housing 12, retaining means 16 and actuating means 19, although not described, are within the scope of the present invention. It is understood, therefore, that this invention is not limited to the particular embodiments disclosed, but it intended to cover all modifications which are within the scope and spirit of the invention as defined by the appended claims.

We claim:

1. An apparatus adapted to receive a mechanism for use in a graphic input system having an input surface, whereby when said mechanism is pressed against said input surface with sufficient force, said apparatus is actuated and a position of the mechanism relative to the input surface is identified, said apparatus comprising:

a housing;

retaining means disposed within at least a portion of said housing adapted for holding said mechanism, wherein said retaining means includes an opening therein into which said mechanism is adapted to be received, said retaining means further including adjustment means for varying a defined size of said opening of said retaining means; and actuating means between said retaining means and said housing for movement of said retaining means relative to said housing to actuate said apparatus.

2. An apparatus according to claim 1, wherein said retaining means comprises a generally elongated clamp, with said clamp having said opening therethrough, said adjustment means comprising a bearing member disposed within at least a part of said opening of said clamp and a biasing means biasing said bearing member for varying said defined size of said clamp opening, whereby said biasing means urges said bearing member in a direction of said mechanism when said mechanism is received within said clamp opening.

3. An apparatus according to claim 1, wherein said mechanism comprises a marker.

4. An apparatus according to claim 1, wherein said apparatus includes a switch responsive to movement of said retaining means for actuating said switch, whereby said retaining means is adapted to actuate said switch corresponding with movement of said retaining means in a direction of said switch.

5. A digitizer apparatus adapted for a marking element, said digitizer apparatus comprising:

a housing;

a holder disposed within at least a portion of said housing; and actuating means between said housing and said holder for moving said holder relative to said housing to actuate said digitizer apparatus;

wherein said holder includes:

a clamp having an opening therein;

a bearing member disposed within at least a part of said clamp opening;

biasing means between said clamp and said bearing member for biasing said bearing member relative to said clamp; and button means for varying a position of said bearing member relative to said clamp and substantially opposing the bias of said biasing means.

6. A digitizer apparatus according to claim 5, wherein said housing defines an inner surface and an outer surface and includes a passage therethrough extending through said inner surface and said outer surface, wherein at least a portion of said button means extends through said passage.

7. A digitizer apparatus according to claim 5, wherein said actuating means comprises sled means attached to said clamp and guide means attached to said housing, said sled means and said guide means being connected together for movement of said sled means substantially axially relative to said guide means.

8. A digitizer apparatus according to claim 7, wherein said apparatus further includes a switch for actuating said apparatus, whereby said marking element is received within said clamp opening and said switch is actuated through contact by said sled means corresponding to movement of said sled means relative to said guide means when sufficient pressure is exerted upon said marking element.

9. A digitizer apparatus according to claim 7, wherein said bearing member and said sled means are of one-piece defined by a generally elongate body having two end portions and two side walls substantially opposing and connected with said body, said body being connected proximate one end to said clamp.

10. A digitizer apparatus according to claim 9, wherein said body includes at least two substantially opposing body fingers connected proximate said opposing side walls, each of said body fingers having proximate a terminating end, a camming surface and a locking surface, said clamp having at least two receptacles therein into which said body fingers are received, whereby said camming surface of each body finger engages said clamp proximate said clamp receptacle flexing said body finger from an original position, said body finger moving back toward its original position when said clamp and said body are connected together, with said locking surface engaging an inside surface of said clamp proximate said clamp receptacle.

11. A digitizer apparatus according to claim 9, wherein said guide means comprises a generally elongate guide member and includes at least two substantially opposing guide fingers connected with said guide member, each of said guide fingers including a channel therein into which said side walls of said generally elongate body are received.

12. A digitizer apparatus according to claim 11, wherein each of said guide fingers includes proximate a terminating end, a camming surface and a locking surface, whereby said camming surface of each guide finger engages said side walls of said body flexing said guide fingers from an original position, each of said guide fingers moving back towards its original position when said body and said guide member are connected together, with each of said locking surfaces engaging said side walls defining said channel.

13. An apparatus adapted to receive a mechanism for use in a graphic input system having an input surface, whereby when said mechanism is pressed against said input surface with sufficient force, said apparatus is actuated and a position of the mechanism relative to the input surface is identified, said apparatus comprising:

a housing;

retaining means disposed within at least a portion of said housing adapted for holding said mechanism, wherein said retaining means includes detachment means for releasing said mechanism, wherein said housing defines an inner surface and an outer surface, said housing including an opening extending through said inner surface and said outer surface through which passes at least a portion of said detachment means; and actuating means between said retaining means and said housing for movement of said retaining means relative to said housing to actuate said apparatus.

14. An apparatus adapted to receive a mechanism for use in a graphic input system having an input surface, whereby when said mechanism is pressed against said input surface with sufficient force, said apparatus is actuated and a position of the mechanism relative to the input surface is identified, said apparatus comprising:

a housing;

retaining means disposed within at least a portion of said housing adapted for holding said mechanism, wherein said retaining means includes detachment means for releasing said mechanism, wherein said detachment means comprises a bearing member, biasing means for biasing said bearing member and button means for varying a position of said retaining means relative to said bearing member and against the bias of said biasing means; and actuating means between said retaining means and said housing for movement of said retaining means relative to said housing to actuate said apparatus.

15. An apparatus adapted to receive a mechanism for use in a graphic input system having an input surface, whereby when said mechanism is pressed against said input surface with sufficient force, said apparatus is actuated and a position of the mechanism relative to the input surface is identified, said apparatus comprising:

a housing;

retaining means disposed within at least a portion of said housing adapted for holding said mechanism; and actuating means between said retaining means and said housing for movement of said retaining means relative to said housing to actuate said apparatus, wherein said actuating means comprises guide means attached to said housing and sled means attached to said retaining means, said guide means and said sled means being slidably connected together for movement of said sled means relative to said guide means.

16. An apparatus according to claim 15, wherein said apparatus further includes attachment means between said retaining means and said sled means for snap fit connection of said retaining means and said sled means.

17. An apparatus according to claim 16, wherein said attachment means comprises at least one generally flexible finger connected with said sled means and said retaining means includes an aperture into which said generally flexible finger is received, wherein said finger includes a camming surface and a locking surface thereon proximate its terminating end, whereby said camming surface engages said retaining means proximate said aperture of said retaining means as said finger is received within said retaining means aperture for flexing said finger from an original position, said finger moving back towards its original position when said retaining means and sled means are connected together with said locking surface engaging an inside surface of said retaining means proximate said opening of said retaining means.

18. An apparatus according to claim 17, wherein said sled means comprises a generally elongated member and includes four finger portions and said retaining means comprises a generally elongated clamp having four apertures therein into which said four fingers are received.

19. An apparatus according to claim 15, wherein said guide means and said sled means includes fastening means therebetween for snap-fit engagement of said guide means and said sled means.

20. An apparatus according to claim 19, wherein said guide means includes at least one generally flexible finger having a camming surface and a locking surface thereon proximate its terminating end, whereby as said guide means and said sled means are connected together, said sled means engages said camming surface for flexing said finger from an original position, said finger moving back toward its original position when said guide means and said sled means are connected together with said locking surface engaging an outer surface of said sled means.

21. An apparatus according to claim 20, wherein said guide means includes six generally flexible fingers.

* * * * *

UNITED STATES PATENT AND TRADEMARK OFFICE
CERTIFICATE OF CORRECTION

PATENT NO. : 5,760,347
DATED : June 2, 1998
INVENTOR(S) : Louis M. Notarianni & Michael J. Leonard It is certified that error appears in the above-identified patent and that said Letters Patent is hereby corrected as shown below:

Col. 1, line 24 between "digitizer " and "A" please insert --.--.
Col. 3, line 43 "wells" should be deleted and inserted therefor --walls--.
Col. 5, line 8 please delete "1 6" and insert therefor --16--.
Col. 5, line 31 after "16" insert --.--.
Col. 5, line 67 after "therefrom" please replace the coma with a period.
Col. 9, line 50 please replace the coma with a period.

Signed and Sealed this

Twenty-fifth Day of August, 1998

Attest:

BRUCE LEHMAN

*Attesting Officer*    Commissioner of Patents and Trademarks